United States Patent

[11] 3,622,211

| [72] | Inventor | Robert E. Mitton<br>523 Highland Ave., National City, Calif. 92050 |
|---|---|---|
| [21] | Appl. No. | 875,227 |
| [22] | Filed | Nov. 10, 1969 |
| [45] | Patented | Nov. 23, 1971 |

[54] LINEAR ROLLER BEARING UNIT
3 Claims, 4 Drawing Figs.

[52] U.S. Cl. ................................................. 308/6
[51] Int. Cl. ................................................. F16c 29/04
[50] Field of Search .................................... 308/6; 64/23

[56] References Cited
UNITED STATES PATENTS
3,097,892  7/1963  Newbury ..................... 308/6
3,194,611  7/1965  Mahony ...................... 308/6

*Primary Examiner*—Edgar W. Geoghegan
*Assistant Examiner*—Barry Grossman
*Attorney*—Carl R. Brown ABSTRACT: A bearing unit for supporting or riding on a linear member, which is held between multiple rollers mounted in a housing through which the linear member passes. The rollers are rotatable about axes substantially perpendicular to the longitudinal axis of the linear member, and in one form of the unit the rollers are radially adjustable to accommodate linear members of various sizes. For simplicity of manufacture and assembly, the housing is made in two similar halves, which are secured together to contain the rollers.

PATENTED NOV 23 1971        3,622,211

INVENTOR.
ROBERT E. MITTON
BY Carl R. Brown
ATTORNEY

LINEAR ROLLER BEARING UNIT

BACKGROUND OF THE INVENTION

Rods, pipes and the like which require support for linear motion, are usually held in some type of slide, or rest on rollers. Slides are often too loose to control the linear member or have too much friction, while supporting rollers do not hold the member securely.

SUMMARY OF THE INVENTION

The bearing unit described herein is contained in a housing which surrounds the linear member to be held. In the housing are several rollers mounted to roll longitudinally on the linear member and spaced circumferentially to hold the member securely. For simplicity of manufacture the housing is made in two similar halves, which are secured together to retain the rollers in individual confining cavities. In one form the rollers are radially adjustable to accommodate linear members of various sizes, and can be locked in place at any set position.

Other objects and many advantages of this invention will become more apparent upon a reading of the following detailed specification and an examination of the drawings wherein like reference numerals designate like parts throughout and in which.

DESCRIPTION OF THE PREFERRED EMBODIMENT

Figure 1:
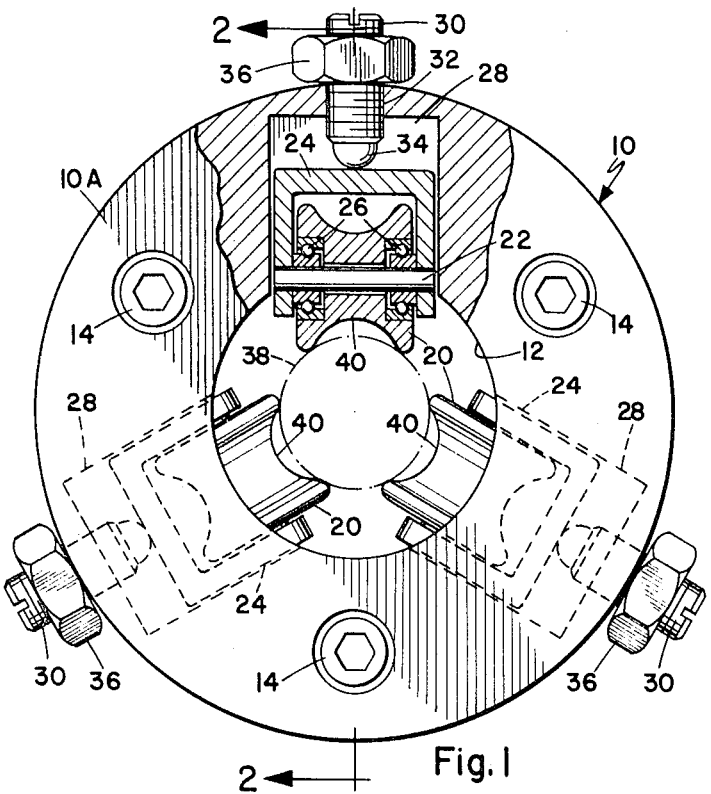
FIG. 1 is an end elevation view, partially cut away, of an adjustable form of the bearing unit.
Figure 2:
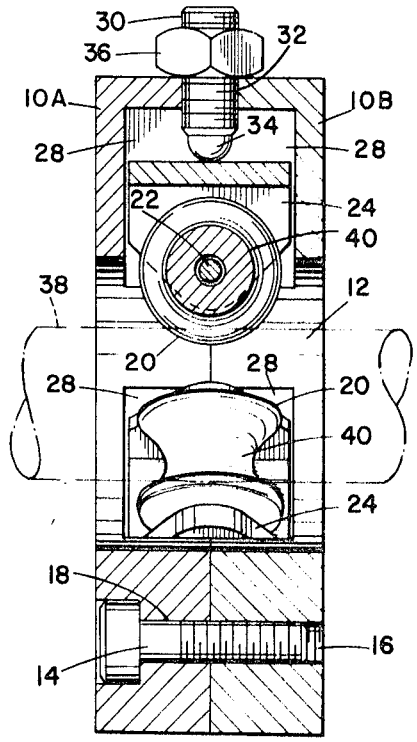
FIG. 2 is a sectional view taken on line 2—2 of FIG. 1.

In the bearing unit shown in FIGS. 1 and 2, the housing 10 is a cylindrical element of short axial length with a central bore 12 and is split perpendicular to the axis into two similar halves 10A and 10B. The two housing portions are secured together by capscrews 14, or the like, the only difference between the halves being that housing half 10B has threaded holes 16, while the half 10A has plain holes 18 to suit the capscrews.

Three rollers are shown, spaced 120° apart, but other arrangements may be used to suit specific requirements. Each roller 20 is mounted on a shaft 22 held in a generally U-shaped yoke 24. Ball bearings 26 are shown in the roller, but could be in the yoke, or other types of bearings could be used depending on the expected loads. For each roller the housing halves have matching cavities 28 opening into and extending radially outwardly from bore 12, each yoke 24 being a close radially sliding fit in its respective cavity. The rotational axes of the rollers are each perpendicular to the longitudinal axis of the linear member and are also in a common plane perpendicular to the member and to the axis of bore 12. Each roller is adjusted by means of a setscrew 30 in a threaded hole 32 extending radially through the housing into the outer end of cavity 28, and having a ball end 34 bearing on yoke 24. A locknut 36 externally of the housing secures each setscrew at any setting. As shown, the setscrews are disposed between the housing halves, with the threads of holes 32 cut equally in each half. Alternatively, the setscrews could be offset in either housing half, or multiple screws could be used.

The bearing unit is shown holding a linear member 38 of circular cross section, such as a pipe or rod. To accommodate various sizes of members, each roller has a concave circumferential groove 40 of arcuate cross section, with a radius approximately equal to the radius of the smallest cylindrical member which can be held with the rollers at full inward positions. On larger members each roller will thus make two point tangential contact with the member, as in FIG. 1.

Figure 3:
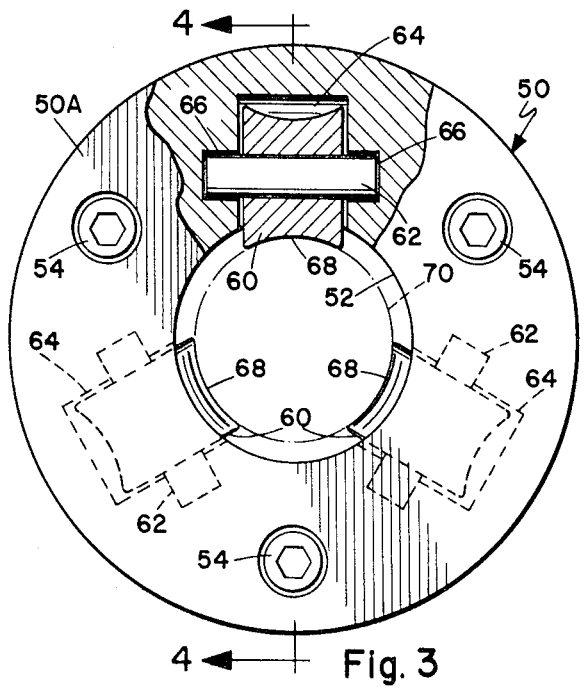
FIG. 3 is an end elevation view of a nonadjustable form of the bearing unit, with a portion cut away.
Figure 4:
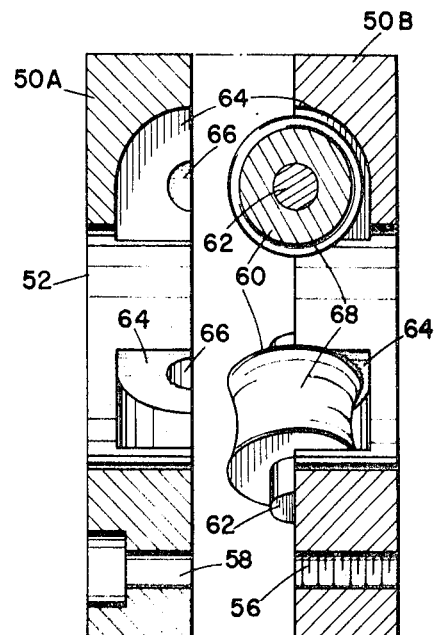
FIG. 4 is a sectional view taken on line 4—4 of FIG. 3, with the housing halves separated.

When the bearing unit is to be used with a linear member of a specific size, the roller adjustment is unnecessary and the simplified structure shown in FIGS. 3 and 4 can be used. In this form the housing 50 is in two similar halves 50A and 50B, with a central bore 52. The housing halves are joined by capscrews 54 passing through plain holes 58 in half 50A and into threaded holes 56 in half 50B. Each roller 60 is mounted on a shaft 62 and the housing halves have matching cavities 64 to receive the rollers. In each cavity 64 is a semicylindrical socket 66 to hold an end of shaft 62 and provide bearings or journals for the roller. For heavy loads, roller or ball bearings could be incorporated in the roller, or in the sockets for the shaft ends. Each roller 60 has an arcuately concave circumferential groove 68 to fit the linear member 70.

In either form the bearing unit provides a smooth rolling support and guide for the linear member. Alternatively the unit could be used as a rolling support for moving along a linear member. While arcuately grooved rollers are shown for cylindrical linear members, it should be understood that suitably shaped rollers could be used for linear members of other cross-sectional configurations.

Having described my invention, I now claim:

1. A linear roller bearing unit comprising:
   a generally cylindrical housing composed of two similar cylindrical portions separated on a plane radially perpendicular to the axis;
   said housing having an axial bore and a plurality of cavities extending radially outwardly from said bore, each of said cavities having substantially equal opposed recesses in each of said portions;
   a roller rotatably mounted in each of said cavities with an axis of rotation substantially perpendicular to the axis of said bore in the plane of separation between said portions;
   and each of said rollers projecting into said bore and having a concave circumferential groove for engagement on a linear member extending substantially axially through the bore.

2. A bearing unit according to claim 1 wherein,
   each of said rollers has a yoke in which the roller is mounted, said yokes being radially slidable in the respective cavities, said housing having adjustment screws extending radially into said cavities at the plane of separation between said portions and bearing on said yokes to apply radially inward pressure thereto.

3. A bearing unit according to claim 1 wherein,
   each of said rollers has an axial shaft, said cavities having opposed closed sockets in which the shafts are journaled, with the rollers retained in said housing portions.

* * * * *